United States Patent
Branson

(10) Patent No.: US 10,151,850 B2
(45) Date of Patent: Dec. 11, 2018

(54) BURIED SERVICE DETECTION

(71) Applicant: CABLE DETECTION LIMITED, Cresswell, Stoke-on-Trent, Staffordshire (GB)

(72) Inventor: Simon Branson, Whiston (GB)

(73) Assignee: CABLE DETECTION LIMITED, Cresswell (GB)

( * ) Notice: Subject to any disclaimer, the term of this patent is extended or adjusted under 35 U.S.C. 154(b) by 343 days.

(21) Appl. No.: 14/871,221

(22) Filed: Sep. 30, 2015

(65) Prior Publication Data
US 2016/0097874 A1 Apr. 7, 2016

(30) Foreign Application Priority Data

Oct. 3, 2014 (EP) ..................................... 14187645

(51) Int. Cl.
- *G01V 3/10* (2006.01)
- *G01V 3/06* (2006.01)
- *G01V 3/08* (2006.01)
- *G01V 3/15* (2006.01)
- *G01V 13/00* (2006.01)

(52) U.S. Cl.
CPC .................. *G01V 3/10* (2013.01); *G01V 3/06* (2013.01); *G01V 3/081* (2013.01); *G01V 3/104* (2013.01); *G01V 3/15* (2013.01); *G01V 13/00* (2013.01)

(58) Field of Classification Search
None
See application file for complete search history.

(56) References Cited

U.S. PATENT DOCUMENTS

| 3,889,179 | A | * | 6/1975 | Cutler | G01V 3/06 324/326 |
|---|---|---|---|---|---|
| 4,438,401 | A | | 3/1984 | Iwamoto et al. | |
| 5,043,666 | A | | 8/1991 | Tavernetti et al. | |
| 5,194,812 | A | | 3/1993 | Yokoi | |

(Continued)

FOREIGN PATENT DOCUMENTS

| CN | 102819045 A | 12/2012 |
|---|---|---|
| CN | 102870012 A | 1/2013 |

(Continued)

OTHER PUBLICATIONS

SN74HC4066 Quadruple Bilateral Analog Switch Data Sheet, Texas Instruments, Mar. 1996, Revised 2016 (cited in prior art Strosser EP 0735377).*

(Continued)

*Primary Examiner* — Daniel Miller
(74) *Attorney, Agent, or Firm* — Maschoff Brennan

(57) ABSTRACT

Some embodiments of the invention relate to a mobile detection device for an evaluation of a distance value from the mobile detection device to an occluded AC-current carrying structure according to its emanated magnetic field, like a location of underground services. The mobile detection device may include multiple detection coils arranged with a spacing with respect to one another and an electronic signal evaluation unit for detecting the structure according to an electrical signal induced in the detection coils by the magnetic field and to evaluate the distance value according to a difference of the electrical signal in-between at least two of the detection coils.

30 Claims, 7 Drawing Sheets

(56) References Cited

U.S. PATENT DOCUMENTS

| | | | |
|---|---|---|---|
| 6,437,573 B1 * | 8/2002 | Golder | G01V 3/108 |
| | | | 324/232 |
| 7,336,078 B1 | 2/2008 | Merewether et al. | |
| 8,183,867 B2 | 5/2012 | Fling et al. | |
| 9,103,939 B2 | 8/2015 | Winter et al. | |
| 9,404,992 B2 | 8/2016 | Peyton et al. | |
| 2003/0029345 A1 * | 2/2003 | Tiernan | B82Y 25/00 |
| | | | 102/221 |
| 2005/0033544 A1 * | 2/2005 | Brooks | G01R 33/02 |
| | | | 702/128 |
| 2010/0060285 A1 | 3/2010 | Pearson et al. | |
| 2012/0325359 A1 * | 12/2012 | Doany | G06K 19/025 |
| | | | 138/104 |
| 2013/0207648 A1 | 8/2013 | Zibold et al. | |
| 2013/0249539 A1 | 9/2013 | Zibold et al. | |
| 2014/0049251 A1 * | 2/2014 | Peyton | G01N 33/20 |
| | | | 324/202 |

FOREIGN PATENT DOCUMENTS

| | | |
|---|---|---|
| CN | 102870013 A | 1/2013 |
| CN | 103635798 A | 3/2014 |
| CN | 203759263 U | 8/2014 |
| EP | 0 735 377 A2 | 10/1996 |
| EP | 1 843 177 A1 | 10/2007 |
| EP | 2 278 358 A1 | 7/2009 |
| EP | 2 362 241 A1 | 8/2011 |
| EP | 2 645 133 A1 | 10/2013 |
| EP | 2 680 044 A2 | 1/2014 |
| WO | 2008/064851 A2 | 6/2008 |
| WO | 2008/064852 A2 | 6/2008 |
| WO | 2011/104314 A2 | 9/2011 |

OTHER PUBLICATIONS

European Search Report dated May 6, 2015 as received in Application No. 14187645.8.

* cited by examiner

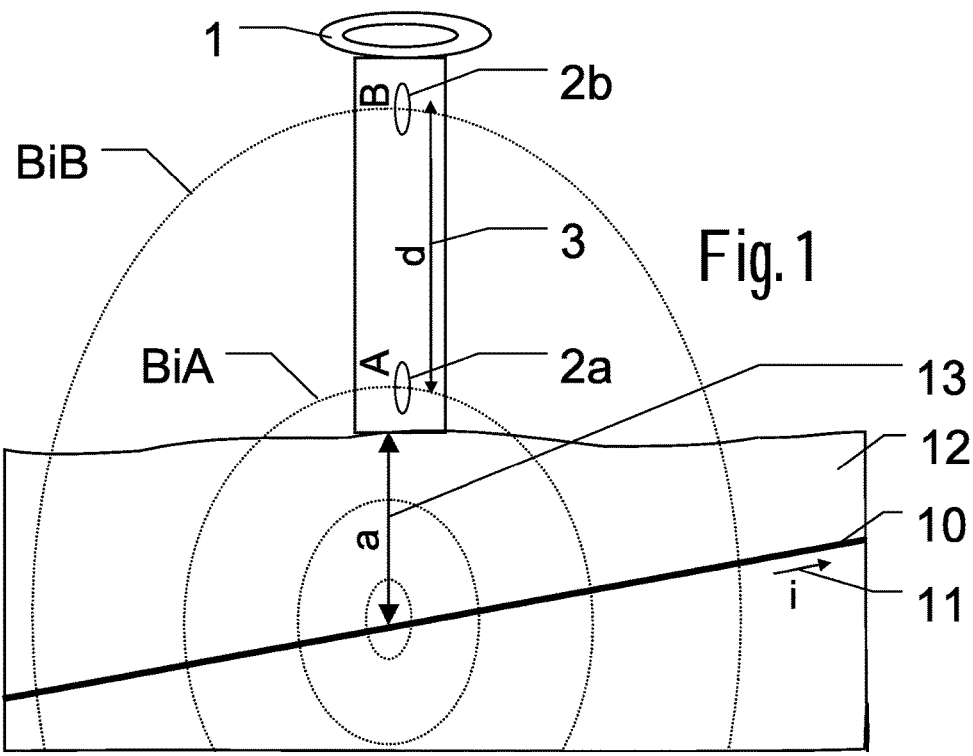
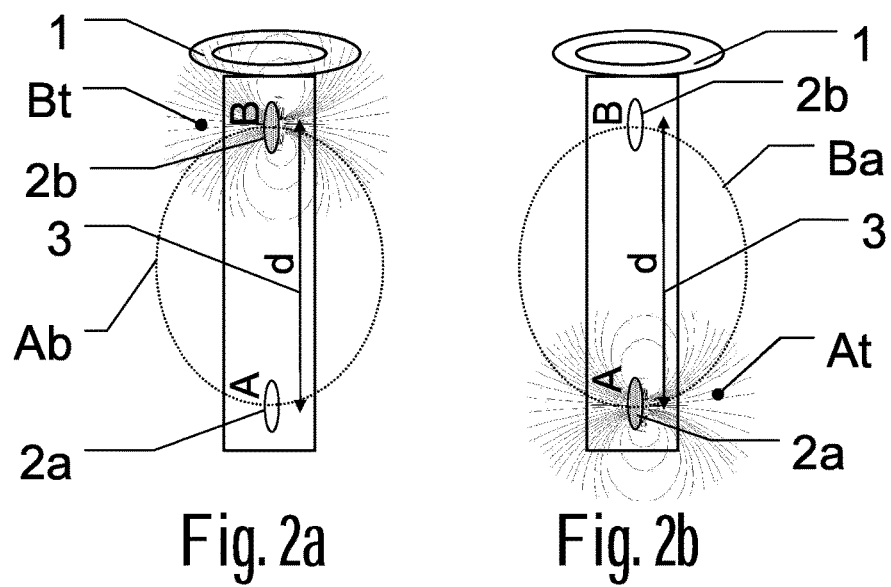
Fig. 1
Fig. 2a    Fig. 2b

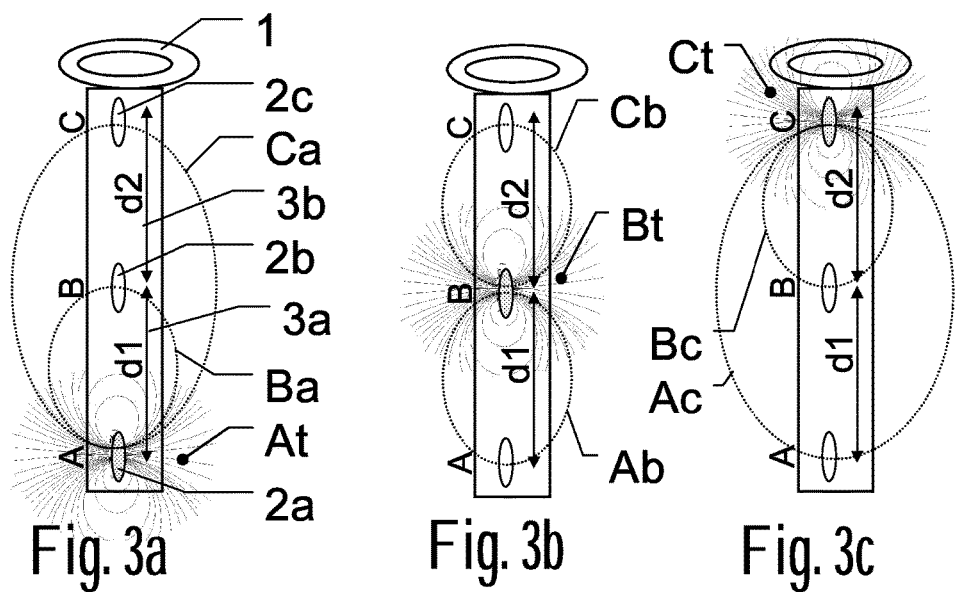
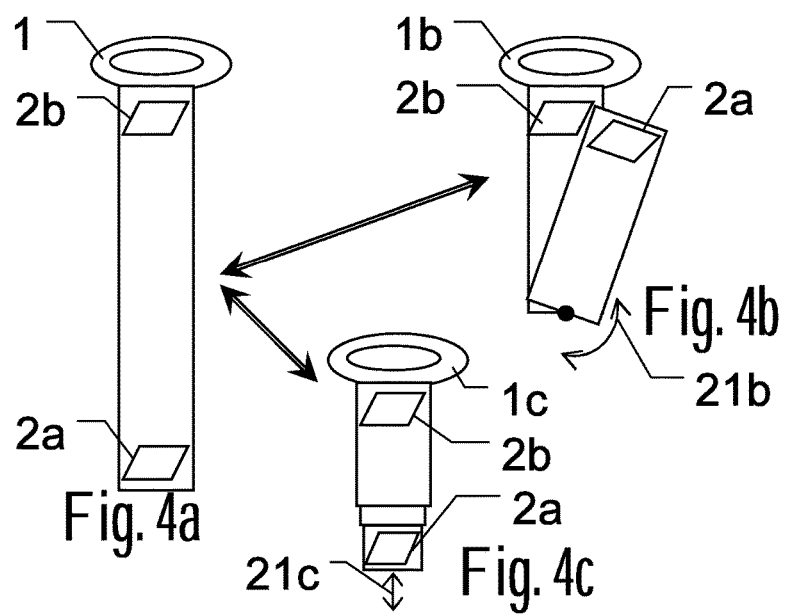

BURIED SERVICE DETECTION

FIELD OF THE INVENTION

The present invention relates generally to a mobile detection device and to a method of calibrating such a device.

BACKGROUND

It is a common task on construction sites to use devices for detecting underground structures before or while earthmoving. Such structures are often occurring in form of services for supplying electricity, gas, fuel, water, or communication data, etc. by underground structures. Although the location of most of these services is or at least should be already known from a surveyor's plan of the site, their locations can have uncertainties or there could be additional services that are not mentioned therein. Often underground services are also simply overlooked or wrongly assessed by the operator of an earth moving machine during work.

Avoidance of damage to underground structures while digging in a trench or in areas being excavated is an important task. As damage to a service can cause serious impact and costs, additional measurements are taken in order to be able to detect the proximity or preferably the exact depth of such services on the site before or while excavating. Therein, it is not only of interest to determine the path, which the buried service is following, but also to determine the depth at which the service is buried, or in other words to determine the distance from the detection device to the service. The distance from the device to the service will further also be referred to as depth, as a common term used for underground wirings, conduits or pipes. Devices for this purpose are known as Cable Detection Tools or Cable Avoidance Tools—also called CAT. An embodiment of such a device is for example described in EP 2 362 241. Such a detection device is mostly embodied movable, which means it can be designed and built as a handheld device to be carried around by a worker. In special movable embodiment of the detection device, it can for example also be mounted at a bucket of an excavator and move with the bucket. In view of this, the detection device is preferably embodied lightweight and small-sized.

One way to locate underground services is to detect electromagnetic fields sent out by the service itself. To do this, the service requires having a naturally occurring electrical signal which emits an electromagnetic field that is detectable above the ground, such as e.g. a live power supply line. To detect other types of services as well, for example a wiring system of switched off street lights, unused or low-voltage communication cables, gas- or water-pipes, additional methods are known. In U.S. Pat. No. 4,438,401 metallic services without naturally occurring signals are directly connected to a signal-generator. In this way, an electrical signal can be coupled to the service, and therefore it is possible to detect it by its electromagnetic field. U.S. Pat. No. 5,194,812 shows a solution for detecting hollow pipes like gas or water pipes by introducing a conductor or sonde into them—or by laying a conductor next to the service—that will function as a transmitter for the field to be detected. In EP 9 166 139 or EP 2 645 133, a field emitting signal is coupled into a conductive underground structure by introducing a current from an AC current-source into soil by earth-spikes or other ground connection means, wherein the current follows along the conductive structure as path of least resistance through soil.

What all the mentioned detection systems have in common, is that the underground structures need to emit an electromagnetic field that is strong enough to be detectable above the surface, especially it has to be detectable non-ambiguously in respect of the always present noise-floor of various other electromagnetic fields from other sources. The electromagnetic fields emitted by different services reside in different ranges of frequency, dependent on the signals present on the service. Power-lines commonly provide currents with a fundamental frequency of 50 Hz or 60 Hz, dependent on the country, and therefore emit fields with the same fundamental frequency. But as e.g. described in EP 2 362 241, also harmonics of the above mentioned frequencies can be used for mains detection, in particular zero sequence harmonics.

Signals that are artificially applied to the structures (either by direct or by soil connection) are restricted in frequency by radio-communication-rules which are country-dependent and given e.g. to avoid interferences with radio communication services. A special example of frequencies allowed in the UK for a general geographic surveillance use, such as cable detection, are the frequencies of 8 kHz or 33 kHz, which are used by some CAT-equipment. For example, the VLF radio band range (=Very Low Frequency radio waves e.g. in the range of about 15 kHz to 60 kHz), especially the low wavelengths in the range of myriameter, are known to penetrate soil material quite well and can therefore be used for cable detection purpose.

The fields emitted by communication lines are another important detection target. For those services, no special single frequency can be expected but rather a range of frequencies has to be taken into account. Still, the emission of frequencies in those bands which are less strictly regulated will likely dominate.

For example as shown in WO 2011/104314, WO 2008/064851 or WO 2008/064852, the depth or distance to a buried service, which can be considered as a long current carrying conductor, can be determined according to the signal strength difference at two pickups located in a known spacing to each other.

A problem therein is that such a depth determination—which depth can be a rather critical value for excavation tasks—is quite sensitive to tolerances in the device's components and manufacturing process, in particular to the characteristics and arrangement of the detection coils.

Therefor, EP 1 843 177 describes a factory calibration rig, in which an individual fine tuning of each cable detection device can be determined in a factory or laboratory environment, in particular after device's fabrication or later on at a certification authority.

Once calibrated, the detection device is regularly exposed to quite harsh environmental conditions at worksites, heat concussions and vibrations in cars when transported, accidental dropping or knocking over, exposure to direct sunlight, snow, rain, water, dirt, etc. Therefore, the factory calibration data might be ill fitting in field operation. In particular, aging and temperature drifts of the electronics and a displacement of the coils in field-usage can have negative impact. Therefore, the guaranteed accuracy levels of the depth values determined by such devices is in general relatively low, e.g. within some decimeters to meters.

SUMMARY

Some embodiments may improve such a cable detection device, in particular to improve the accuracy and/or reliability of its depth determination.

Some embodiments may improve the robustness of the detection device against environmental influences and electrical and mechanical tolerances.

Some embodiments may provide a detection device for buried services, which is built to be self-calibrated, without requiring external equipment or a special setup, in particular field calibrated, so the calibration can be done or verified by the device on its own, at any time and location.

Some embodiments may provide a detection device which can be resized, in particular to require less storage space while still providing high depth detection accuracies.

According to some embodiments of the present invention, a device with improved calibration capabilities is provided, in particular by providing a device which is built to be field calibrated by a corresponding calibration method, which can preferably be executed anytime and anywhere by an inexperienced operator, e.g. in field or before each detection usage. The calibration should preferably be done quickly and should be robust against external influences.

Some embodiments of the present invention, therefore, relates to a mobile detection device for an evaluation of a distance value from the device to an occluded AC-current carrying structure according to its emanated magnetic field. For example, a cable detection device for a location of buried services like electrical wiring, cables, gas or water pipes, etc. which are occluded underground at a construction site. The device is thereby in particular built to determine the depth, in which the service is buried.

The device comprises at least a first and a second coil, each comprising at least one winding of an electrically conductive material. The winding is enclosing an area and can be of arbitrary shape, e.g. round, circular, rectangular and preferably substantially flat, with a height comparably much lower than the outer dimensions of the enclosed area.

The coils are arranged at the detection device with a fixed location with respect to one another. The locations can be defined by a spacing in-between the coils, for example by a spacing of the coil axis, which can be defined in the centre of and normal to the coil area. The locations are fixed, which means that the coils are not built to be moved with respect to each other during a depth measurement. Nevertheless, e.g. due mechanical shocks, temperature influences or the like, the coils locations can vary in small tolerances over time.

In a special embodiment, the device can be embodied to be foldable, collapsible or telescopic, for example to reduce the device's size for storage and/or transportation into a first position and to expand the device into a second position for usage, in which the spacing in-between the coils is increased for good detection results, wherein the second position can be fixed. In such an embodiment, the below discussed self-calibration according to the present invention can be especially advantageous, as the exact location of the fixing in the second position may slightly vary from expansion to expansion, and such a variation can be compensated by a calibration after each expansion. The present invention therefore also relates to a mobile cable detection device, being mechanically resizable in at least two fixable positions, in particular foldable, collapsible or telescopic, in which positions a distance in-between the coils for detection is different, which device can in particular comprise a calibration as discussed herein.

The device also comprises an electronic signal evaluation unit for detecting the structure. The detection is done according to electrical signals, which are induced in the coils by the magnetic field emanated by the structure. The signal evaluation unit therein evaluates the distance value from the device to the structure according to a difference of the electrical signal from at least two of the detection coils.

In particular, the signal evaluation unit can thereby comprise at least one of:
- an amplifier circuit connected to the coil, for amplifying the electrical signal induced in the coil by the magnetic field from the structure,
- a bandwidth limiting filter for the electrical signal, which is built to suppress undesired frequency ranges and/or to avoid aliasing,
- an analog to digital converter for digitizing the filtered output of the amplifier circuit to a time and value discrete digital representation, and/or
- a computation unit built in such a way to detect the structure according to an evaluation of the digital representation, in particular according to a difference in signal strength in-between the at least first and second coil.

In particular, no information content is contained in the electrical signal from the detection coil or if, such information content is not evaluated by the detection device for the purpose of extracting the information content itself, at most, a possible identification of the signal as such is done by the detection device.

According to the present invention, the detection device comprises a calibration unit. This calibration unit is built to successively configure one of the at least first or second coil of the device as transmitter for a defined electrical excitation signal to emit a magnetic calibration field, during a calibration routine. The electrical excitation signal can in particular be defined in one or more of frequency, current strength, and/or modulation.

The magnetic calibration field is received or detected by at least one remaining of the at least first or second coil, which is at present not configured as transmitter.

Calibration parameters for the detection device are determined by the calibration unit based on the received calibration field, in particular calibration parameters for the depth determination, like an offset parameter and/or a scaling parameter for at least the first and the second coil. Another calibration parameter could e.g. be a phase shift parameter and/or coil location parameter.

The thereby determined calibration parameters can then be applied to the electrical signals from a to be detected structure (in their digital and/or analog representation), for an at least partial compensation of differing receiving characteristics of the at least first and second coils and/or their corresponding signal evaluation paths of the signal evaluation unit, in particular of the amplifier, filter and/or analog to digital converter.

The electrical excitation signal can be generated by a signal generator. In one embodiment, there can be one signal generator selectively connectable to one of the coils by a switching means, so that the calibration unit is built to apply the same excitation signal to a permutation or succession of the at least first and second coil. In another embodiment, there can be a dedicated excitation signal generator for each of the detection coils.

In an embodiment, the electrical excitation signal can in particular have known electrical characteristics, which can be defined by design of the signal generator or measured.

For example in a first embodiment of this aspect, the excitation signal can be measured by the receiving section of the electronic signal evaluation unit which is normally used for detecting the structure, when this receiving section is connected in parallel to the electrical excitation signal that is applied to the one of the detection coils which is transmitting calibration field. In a second embodiment of this aspect, the coil can be switched electively to either the receiving section or to the generating excitation signal source, wherein the excitation signal is either defined by design of the source (e.g. fixed by design or regulated) or measured by other means. In a third embodiment of this aspect, the excitation signal can be applied without exactly defined or measured knowledge of its electrical characteristics, which can—not only—but in particular be used, if the same excitation signal is electively switched to one of the detection coils.

In an embodiment, in particular with more than two coils, the electrical excitation signal is not required to have exactly known electrical characteristics, as discussed further below, although the frequency of the excitation signal should preferably be within the detection bandwidth of the device or coarsely correspond to the frequency of the fields from the structures to be detected.

In other words, in the present invention, the at least first and second coil of the detection device is operable as a transmitter for a magnetic calibration field, which calibration field is picked up by the remaining of the coils and the thereby resulting values are evaluated to determine calibration parameters for the coils. Therefore, the device according to the present invention is capable of a self-calibration without a requirement for external calibration devices or an application of defined and known magnetic fields from external to the device.

As said, the detection device comprises a calibration unit built to configure one of the detection coils as transmitter for a calibration field by applying an electrical excitation signal, which calibration field is detected by the remaining of the detection coils and the detected values of the calibration field, in particular its strength are stored. Thereon, the calibration unit determines calibration parameters for the detection coils based on stored values of the detected calibration field.

In a special example of an embodiment, the detection device can comprise at least a first and a second of the detection coils, in particular exactly two—the first and the second detection coil, and the calibration unit is built to successively configure one of those detection coils after the other as transmitter for the calibration field, while detecting the calibration field with the remaining detection coil and determining coil-calibration parameters there from.

In another special example of an embodiment, the detection device comprises at least a first, a second and a third detection coil, in particular exactly three—the first, the second and the third detection coil, and the calibration unit is built to successively apply the electrical excitation signal to one of the at least first, second or third detection coil after the other in order to configure it to transmit the calibration field. The calibration field is then detected by the two remaining of the detection coils, to which the excitation signal is not applied, and a set of the detected values of the calibration field, in particular its strength values, are stored. Thereupon, the calibration unit determines calibration parameters for at least two of the coils, based on the stored calibration field values. Therein, the calibration parameters can for example comprise a gain and an offset parameter for field values determined by the detection coils. Optionally, also the spacing in-between the detection coils can be determined as a calibration parameter, which can then be used to compensate for errors during a detection of a structure.

The invention can also be implemented in device with more than three detection coils. Preferably, the calibration unit determines calibration parameters for each detection coil (which determination considers by its nature also the coils evaluation circuit).

The electrical excitation signal can be generated by a current signal generator (which can have a regulated output signal). In an embodiment, there can be a single signal generator whose output is selectively switchable to one of the detection coils, so that all detection coils can be excited substantially by an equal signal. The excitation signal can for example be a sine wave of known frequency. In another embodiment, the excitation signal can also have another waveform and/or can have a variable or modulable amplitude and/or frequency, whereby in a special example the calibration signal can be modulated or coded in such a way to make it uniquely distinguishable from other environment signals and noise.

As a certain aspect of the invention, which could also be considered on its own during a detection of structures, the electronic signal evaluation unit can comprise an amplifier circuit embodied as a current sensing amplifier as a first amplification stage which is connected to the detection coil. It can in particular be embodied as a transimpedance amplifier, preferably having a low input impedance, for example below 100 Ohm in the relevant frequency range of about 50 to 100.000 Hz, and can be tuned to have a substantially linear output over a frequency range of about at least 100 to several hundred kHz.

In one practical embodiment, the current sensing amplifier can comprise an operational amplifier (OpAmp) with a feedback network in a current to voltage configuration. This circuit can in particular be embodied in way that the negative OpAmp input is connected to one end of the coil, the other end of the detection coil is connected to the positive OpAmp input and the OpAmp output is fed back to the negative OpAmp input by a first impedance, in particular a resistive and capacitive impedance.

In another practical embodiment, the current sensing amplifier can be embodied with an input stage comprising a JFET in a feedback loop of a first operational amplifier stage in a current to voltage configuration. Therein, the JFETs-Gate can for example be connected to the detection coil and with the feedback network. Preferably, this circuit also comprises an active operation point setting and/or bootstrapping comprising a second OpAmp that is biasing the first operational amplifier stage.

Therein, the detection coils each can have a low winding count of 1 to 500 turns of a conductor with a cross-section of at least about 0.1 $mm^2$, wherein the winding of the detection coil encloses an area of more than 100 $cm^2$ and below 0.5 $m^2$, preferably with an approximately rectangular or circular cross-section. In any of above embodiments, the output impedance of the detection coil can be above the input impedance of the first amplification stage to which the detection coil is connected.

In an embodiment of the invention, the detection coils are embodied as tracks on a PCB, wherein the PCB also comprises the current sensing amplifier mentioned above.

In a regular embodiment according to the invention, the detection coil has a single multiturn-winding with two ports, which will be used as well for transmitter as for receiving magnetic fields. In a special embodiment, the detection coil can alternatively comprise a dedicated transmitter winding portion for application of the excitation signal and a dedicated receiver winding portion for detecting magnetic fields, preferably wherein both winding portions are magnetically coaxial to each other, and wherein the two portions are on a common rigid, preferably one-pieced, carrier.

The invention also relates to a calibration method for a mobile detection device which comprises multiple detection coils for an evaluation of a distance or depth value from the detection device to an occluded AC-current carrying structure, in particular for a location of services occluded underground at a construction site, according to the structures emanated magnetic field. This calibration involves, applying an electrical excitation signal to one of the detection coils, which then acts as a magnetic field transmitter for a calibration field, and receiving and evaluating the calibration field by the remaining detection coils. Transmitting and receiving is done multiple times with a permutation of the detection coils usage for transmitting or receiving, preferably for all possible permutations. Then a determining of calibration parameters, in particular an offset and gain calibration parameter, for at least two of the detection coils, preferably for all coils, is done by a calibration unit, based on a set of the evaluated calibration fields from each of the permutations.

Therein, the detection device can comprise at least a first, a second and a third detection coil, in particular only a first, a second and a third detection coil. and the calibration unit is successively applying an electrical excitation signal to one of the at least first, second or third detection coils for transmitting the calibration field. In each succession, a detecting of the calibration field is done by the remaining of the detection coils (to which the excitation signal is presently not applied) and storing of the values of the calibration field, in particular of a field strength value. A determining of the calibration parameters is then done for each of the detection coils, based on the stored values.

Therein, the receiving and evaluating with the detection coils can comprise an amplifying of the detection coils output in current mode by a current mode amplifier, which is providing low input impedance to the detection coil, in particular with a winding count of the detection coil below 100.

The method, or at least those parts of it which involve computation and/or calculation, can also be embodied as a computer program product that is stored on a machine readable medium or embodied as electromagnetic wave (such as e.g. a wired or wireless data signal). Consequently, the invention further relates to such a computer program product comprising program code for a calibration of a detection device according to the invention. The program code is therein in particular built for executing an applying of an excitation signal to one detection coil of the detection device for emanating a calibration field, a receiving of the calibration field by at least one other coil of the detection device and storing a field value, wherein the applying and receiving is done alternately for the detection coils of the detection device, preferably to cover all possible permutations, and a calculating of calibration parameters for the detection device based on the stored field values.

The computer program can be executed in a calibration unit of a detection device according to the invention, which device therefore also involves a computation means built to run a computer program providing calibration functionality according to the invention, with or without the computer program actually loaded.

BRIEF DESCRIPTION OF THE DRAWINGS

Devices, methods and setups according to the invention are described or explained in more detail below, purely by way of example, with reference to working examples shown schematically in the drawing. Specifically, FIG. 1 shows an example of an embodiment of a mobile detection device to which the present document relates;

FIG. 2a and FIG. 2b are showing an example of a first embodiment of a detection device and its calibration according to the invention;

FIG. 3a, FIG. 3b and FIG. 3c are showing example of a second embodiment of a detection device and its calibration according to the invention;

FIG. 4a, FIG. 4b and FIG. 4c are showing examples of embodiments of a detection device according to the present invention which are resizable, in particular with a calibration according to the invention;

Figure 5:
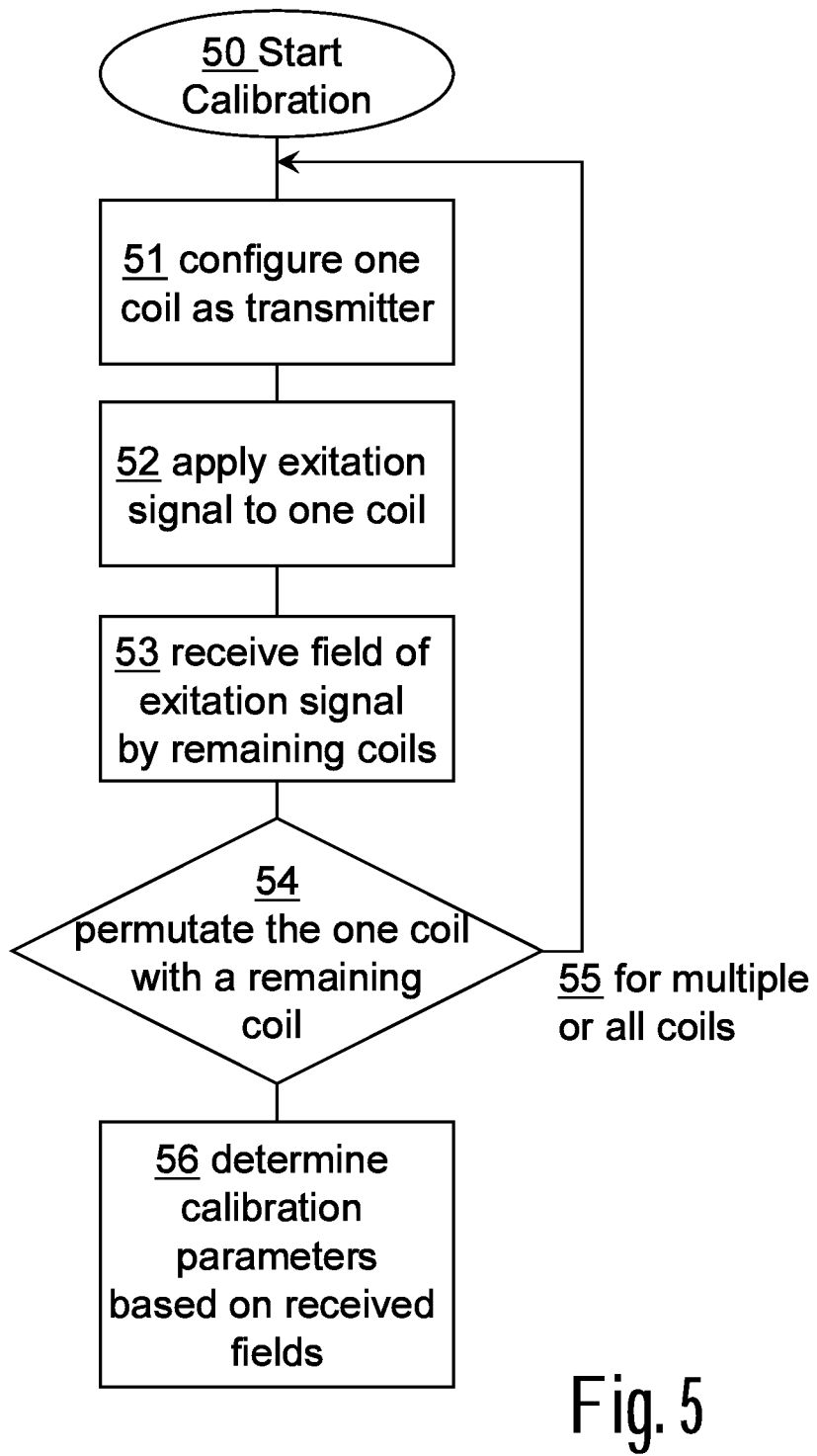
FIG. 5 shows an example of a block diagram illustrating the principle of a self-calibration of a detection device according to the invention.

The diagrams of the figures should not be considered as being drawn to scale. Where appropriate, the same reference signs are used for the same features or for features with similar functionalities. Different indices to reference signs are used to differentiate between different embodiments of a feature which are shown as examples.

DETAILED DESCRIPTION

FIG. 1 shows an embodiment of a mobile detection device 1 for an evaluation of an "a" distance value 13 from the device 1 to a structure 10 buried in ground 12, which is carrying "i" as an alternating electrical current 11 and which thereby emanates a magnetic field BiB,BiA. The device 1 comprises at least two coils, as the shown "A"-coil 2a and a "B"-coil 2b, which are arranged with "d" as spacing 3 with respect to each other. The magnetic field emanated from the current 11 in the structure 10 is illustrated by the magnetic field lines BiA and BiB, where the first character B indicates a magnetic field, the second character "i" indicates the source of the field—which is the current 11, and the third character indicates the place of measurement—which is the "A"-coil 2a respectively the "B"-coil 2b.

The detection of the structure or service 10, which can e.g. be an underground cable, sonde, pipe, etc. carrying per se or artificially introduced an electrical current, is done by detecting the magnetic fields BiA,BiB by the coil 2a and the coil 2b. The buried service 10 can therein be considered as a long current carrying conductor, emitting the magnetic field. The depth 13 from a defined point of the device 1 to the buried service 10 can be mathematically expressed by the formula $$\text{Depth} = \frac{d}{\left(\frac{A}{B}\right) - 1},$$

wherein "Depth" is the value "a" of the depth 13, "A" is the magnetic field strengths at the coil 2a and "B" at the coil 2b, and "d" is the separation 3 of coil 2a and coil 2b.

Strictly speaking, the depth 13 is in general determined with respect to the central axis of the coils 2a,2b comprised in the device 1, and not with respect to ground level. This can e.g. be overcome by defining the determined distance which is determined with respect to the underside of the device 1 (e.g. by an according offset of the depth value provided by the device 1) and putting down the underside of the device 1 on ground level for an exact measurement. Another option is to define a working distance from the underside to the ground 12, at which the device 1 has to be operated and providing the depth value 13 with respect to the thereby resulting offset. Yet another, probably novel approach for such devices 1 and an invention on its own is, that the detection device 1 comprises at least one proximity-sensor, in particular an optical or ultrasound distance measurement unit, at the underside, for measuring a spacing from the device's underside to ground level, preferably in the same measurement direction as the magnetic depth determination. The actual ground-spacing-value determined by the proximity-sensor is then used as an offset for the determined depth 13, so that the indicated depth value is always relative to ground level, regardless how the device 1 is held.

Apparently, also more then the above described at least two coils 2a and 2b can be used for the detection, in particular for providing redundant data and/or increased accuracy. For the detection of the structure 10 and its depth 13 determination, the device 1 comprises a (here not explicitly illustrated) electronic signal evaluation unit. Preferably, the evaluation unit comprises a programmable and/or hardwired digital computation unit, like a microprocessor, DSP, FPGA, ASIC, etc.

The above described detection relates to the signal strength of the magnetic fields BiA,BiB which are determined by means of the coils 2a and 2b as well as on the location of the coils 2a and 2b with respect to each other. In view of tolerances and aging of the components and their locations in the detection device 1, the introductorily mentioned prior art uses an external calibration rig with Helmholtz-Coils to generate electromagnetic fields that emulate those of a long straight cable in defined distance, to which the detection device 1 is then factory-calibrated.

FIG. 2a and FIG. 2b are illustrating an embodiment of the principle of the approach according to the present invention, according to which a self-calibration of the detection device 1, for example also in the field—without requiring an external calibration rig, is achieved. Such a self-calibration according to the present invention, which e.g. can be embodied by a calibration unit providing a special calibration mode or function of the device 1, is explained in the following. The here not explicitly shown calibration unit of the detection device 1 can thereby e.g. also at least partially use the same hardware resources as the evaluation unit.

In the arrangement shown in FIG. 2a, the coil 2a is configured in ordinary receiving mode, which is equal to the one used for the above described detection of a buried service 10, e.g. the coil 2a being connected to an amplifier, filter and/or analog to digital converter.

The role of the coil 2b is reversed, as it is not used for reception as during detection, but used to transmit a known signal, resulting in a magnetic field Bt. This can be achieved by applying an electrical excitation signal to the coil 2b, which signal preferably has a known characteristic, such as frequency, current strength and/or phase. To achieve such, coil 2b can be connected or switched to an electrical signal source, in particular a current source, by the calibration unit. The excitation signal is an ac signal, preferably within a frequency range of the detection device 1 that is also used for the detection of the structure 10. For example either with a frequency of mains supply (like e.g. 50 or 60 Hz) or one of its harmonics, with a standard detection frequency provided by a detection signal injection source that can be applied to a service 10 (like about 8 or 33 kHz) and/or within a radio range of e.g. about 15 kHz to 60 kHz.

The coil 2a now receives the magnetic field Ab emitted by the now transmitting coil 2b and the detected signal can be analyzed and/or stored by the calibration unit, e.g. the signal strength and/or an eventually occurring phase shift can be determined.

By the receiving circuitry and electronics, a certain received signal of interest can be selected and the system will be hardly influenced by any outside interference, or noise, wherefore specific frequencies for transmission and reception can be selected, and/or the excitation signal can be specifically coded or modulated and the reception signal accordingly demodulated to differentiate the calibration signal from other external signals (still, no information content of the calibration signal is evaluated and provided to another means). According to the invention, not only the characteristics of the receiving coil 2a, but also those of the whole receiving circuitry up to the digitalized values can be determined and calibrated.

As shown in FIG. 2b, in the present invention, the functionalities can be reversed, and the coil 2a can be configured as the transmitter for the field At and the coil 2b as the receiver for the field Ba from coil 2a. The determined field Ba can also be evaluated and/or stored. In a special embodiment, the same excitation signal, preferably from the same excitation signal source, can be applied successively to coil 2a and coil 2b, for example by an according switching unit.

Based on the stored data with respect to the received calibration fields Ab,Ba, the calibration unit can self calibrate the detection device 1 by determining calibration parameters for the coils 2a,2b, by which parameters deviations in offsets and/or gains can be adjusted to zero. Those calibration parameters can then be applied to the field signals of the structure 10 to be detected during a detection, in order to compensate inaccuracies and to gain good detection results and a correct depth value 13.

In an illustrative example of a practical embodiment in FIG. 2a and FIG. 2b, two coils 2a A and 2b B (often also named "Top"- and "Bottom"—antennas in cable locator devices) are separated by a distance 3 "d". It can be assumed that the two coils 2a,2b are substantially in the same plane and any offsets in the vertical plane are negligible. According to the present invention each of the coils 2a,2b can also be configured as a transmitter; an excitation signal applied to coil 2a configures it as a transmitter for a calibration field At which field can be received by coil 2b and vice versa. The excitation signal can for example be a pure sine wave of a known frequency, chosen.

In practical designs it can happen that, the coil spacing 3 "d" can initially not be accurately controlled due to the manufacturing processes and/or "d" may vary with temperature and time. A small change in "d" can give a significant change in the received signal strength—wherefore the depth determination will get inaccurate.

As shown in FIG. 2b, the magnetic field Ba at a distance 3 from the transmitter coil 2a that has a coil radius R, is given by the Biot Savart Law, known from textbooks:

$$B = \frac{\mu_0 i R^2}{4\pi 2(R^2 + d^3)^{3/2}}$$

To simplify the analysis it is assumed that Area=the cross sectional area of the coil, so that $$B \sim \frac{\mu_0 i \text{Area}}{2\pi d^3}.$$

In conformance with both FIG. 2a and FIG. 2b, the following terminology will be used:
Ba=received signal at B from A,
Ab=received signal at A from B,
At=transmitted signal from A,
Bt=transmitted signal from B.

According to the formula, the received signal is proportional to $(1/d)^3$ (which ratio is the same for a field from a structure during detection), which gives:

$$At \sim \left(\frac{Ba}{d}\right)^3, \text{ and } Bt \sim \left(\frac{Ab}{d}\right)^3.$$

If everything would be perfect, Ba and Ab would be equal. As this is not the practical case, a calibration value Ks to compensate for any variation in "gain" is introduced. So a calibration of the detection device 1 is achieved by determining a calibration parameter, which makes sensor 2b give the same readings as sensor 2a, such that:

*Ab=Ba·Ks.*

If it can be assumed in a certain embodiment that the locations of the coils 2a,2b with respect to each other can be considered fixed and/or known, their spacing 3 can also be included in the calculation of the calibration parameters. For example, a value for the spacing "d" of 0.5 m is theoretically giving a known field-ratio of 8. Therefore, using the coil 2a as a transmitter, we expect a signal ratio in-between coil 2a and coil 2b of 8, and based on the actually measured values, calibration parameters for a correction for anomalies in the ratio measurement can be determined. This can be repeated for multiple or all coils. The nature of the electromagnetic detection coils 2a,2b, for this application can be considered reversible; in that when a coil is configured as electromagnetic transmitter, it can be regarded to have the inherent capability to transmit with substantially equal characteristics as it receives. If the same results are obtained, then it can be concluded that there are no differences in the response and/or sensitivity of the two coils 2a and 2b.

The excitation signal can therein be sequentially applied to each one of the coils 2a,2b after the other, while the remaining coils are configured to detect the thereby induced calibration signal. It is not required to excite multiple coils with coordinated excitation signals as in the external Helmholz calibration rig of prior art, but optionally, in an embodiment with an additional step, the calibration could be verified by applying a defined difference in the excitation current to each of the transmitting detection coils to verify the above analysis.

In a special embodiment, the calibration can also be repeated for multiple excitation signal frequencies to cover a possible nonlinear frequency response of the coils 2a,2b and/or the receiving electronics, for example once in the mains frequency range and once in the radio frequency range. The coils 2a,2b can each on its own be evaluated by a detection circuit. For the present invention, it is not required to connect the coils 2a,2b into a serial or parallel connection.

FIG. 3a, FIG. 3b and FIG. 3c, are showing an example of an embodiment of the invention regarding a calibration for a mobile cable detection device 1, which comprises three coils A°2a, B°2b and C°2c.

The three coils 2a, 2b and 2c are separated by the distances "d1" 3a and "d2"°3b in a Cable Location Instrument 1. This arrangement of the coils 2a, 2b and 2c is also used for the location of occluded structures 10.

As discussed above, according to the present invention, a calibration unit is built in such a way that the coils 2a,2b,2c can be configured as transmitter for calibration fields At,bt, Ct. Thereby, e.g. coil 2a can receive a signal transmitted from coil 2b (FIG. 3b) or from coil 2c (FIG. 3c); Coli 2b can detect signals from coil 2a (FIG. 3a) or coil 2c (FIG. 3c), and so on . . . .

In the following, the terminology will comprise:
At=transmitted signal from coil A;
Bt=transmitted signal from coil B;
Ct=transmitted signal from coil C;
Ab=received signal at coil A from coil B;
Ac=received signal at coil A from coil C;
Ba=received signal at coil B from coil A;
Bc=received signal at coil B from coil C;
Ca=received signal at coil C from coil A;
Cb=received signal at coil C from coil B;

Consider FIG. 3a, where coil A 2a is configured as transmitter of the field At, which is received by coil B 2b as field Ba and by coil ° 2c as field Ca.

In general, the magnetic field B at a distance d from the transmitter, of a coil radius R, is again given by the Biot Savart Law:

$$B = \frac{\mu_0 i R^2}{4\pi 2(R^2 + d^3)^{3/2}}$$

Again, with the simplifying assumption that: Area=the cross sectional area of the coil, which results:

$$B \sim \frac{\mu_0 i \text{Area}}{2\pi d^3}.$$

When coil A is applied an excitation signal, transmitting the field At whereof Ba and Ca are the measured values of the received fields, this can be written as:

$$At = \frac{Ba}{(d1+d2)^3} = \frac{Ca}{(d1)^3} At = \frac{Ba}{(d1+d2)^3} = \frac{Ca}{d1^3}, \quad (1)$$

and similarly for FIG. 3b and FIG. 3c:

$$Bt = \frac{Ab}{(d1+d2)^3} = \frac{Cb}{d2^3} Bt = \frac{Ab}{(d1+d2)^3} = \frac{Cb}{d2^3} \text{ and} \quad (2)$$

$$Ct = \frac{Bc}{(d2)^3} = \frac{Ac}{(d1)^3} Ct = \frac{Bc}{d2^3} = \frac{Ac}{d1^3}. \quad (3)$$

This gives:

$$\text{From } (3) \frac{d1^3}{d2^3} = \frac{Ac}{Bc} \frac{d1^3}{d2^3} = \frac{Ac}{Bc}; \quad (4)$$

$$\text{From } (2)(d1+d2)^3 = \frac{d2^3 Ab}{Cb}(d1+d2)^3 = \frac{d2^3 Ab}{Cb}; \quad (5)$$

$$\text{From } (1)(d1+d2)^3 = \frac{d1^3 Ba}{Ca}(d1+d2)^3 = \frac{d1^3 Ba}{Ca}. \quad (6)$$

Therefore: $\frac{d2^3 Ab}{Cb} = \frac{d1^3 Ba}{Ca}$, and $\frac{d1^3}{d2^3} = \frac{Ab \cdot Ca}{Ba \cdot Cb} = \frac{Ac}{Bc}$, resulting in $$\frac{Ab \cdot Ca \cdot Bc}{Ac \cdot Ba \cdot Cb} = 1 \frac{Ab \cdot Ca \cdot Bc}{Ac \cdot Ba \cdot Cb} = 1. \quad (7)$$

This result is independent of the distances, d1 and d2.

To calibrate the sensors, a modification of the measurements detected by the coil 2b relative to coil 2a can be done by calibration parameters:

$$A = Ks \cdot B + Ko,$$

where Ks is a calibration scaling factor and Ko is a calibration offset.

Substituting for Ab in (7) results $$\frac{(Ks \cdot Bb + Ko)}{Ac} \cdot \frac{Ca}{Ba} \cdot \frac{Bc}{Cb} = 1 \frac{(Ks \cdot Bb + Ko)}{Ac} \cdot \frac{Ca}{Ba} \cdot \frac{Bc}{Cb} = 1. \quad (8)$$

Substituting for Ac in (7) results $$\frac{Ab}{Ba} \cdot \frac{Ca}{(Ks \cdot Bc + Ko)} \cdot \frac{Bc}{Cb} = 1 \frac{Ab}{Ba} \cdot \frac{Ca}{(Ks \cdot Bc + Ko)} \cdot \frac{Bc}{Cb} = 1. \quad (9)$$

And from (8)

$$Ko = Bc \cdot Ab \cdot \frac{(Ac \cdot Ba \cdot Cb)}{(Ca \cdot Bc)} - Ks \cdot BbKo = \quad (10)$$

$$Bc \cdot Ab \cdot \frac{(Ac \cdot Ba \cdot Cb)}{(Ca \cdot Bc)} - Ks \cdot Bb.$$

Substituting Ko into (9) gives $$\frac{Ab}{Ba} \cdot \frac{Ca}{Ks \cdot Bc + \left(Bc \cdot Ab \cdot \frac{Ac \cdot Ba \cdot Cb}{Cb \cdot Bc}\right) - Ks \cdot Bb} \cdot \frac{Bc}{Cb} = 1.$$

This can be solved for Ks, resulting in:

$$Ks = \left(\frac{1}{(Bc - Bb)}\right) \cdot \left(\left(\frac{Ba \cdot Cb}{Ab \cdot Bc \cdot Ca}\right) - \left(\frac{Ab \cdot Ac \cdot Ba \cdot Cb}{Bc \cdot Cb}\right)\right) \quad (11)$$

$$Ks = \frac{1}{Bc - Bb} \cdot \left(\frac{Ba \cdot Cb}{Ac \cdot Ba \cdot Cb} - \frac{Ab \cdot Ac \cdot Ba \cdot Cb}{bc \cdot Cb}\right).$$

From (11) and (10), the two calibration parameters, which have to be applied to the detected signal from coil 2b can be determined. When those correction factors are applied, the coil 2a and 2b will now read the correct values for an applied field, not only for the calibration field but also for a field from a structure 10 to be detected.

Optionally, in order to verify that the coil array will read the depth correctly, an electromagnetic field of known frequency and intensity can be introduced deliberately. As the depth to a buried service, which can be considered as a long current carrying conductor, is given by:

$$\text{Depth} = \frac{1}{\left(\frac{A}{B}\right) - 1},$$

this could be verified by applying a known difference in current to each of the transmitters and repeating the above analysis.

From above calibration and formulas, also the values of d1 and d2 can be calculated, which can e.g. be defined with respect to a central axis of the coil windings.

The herein shown formulas are shown exemplary to explain the basic principle and to show that it is physically and logically possible to achieve a calibration based on the principle according to the present invention. In other embodiments of the present invention, the basic formulas from above can be modified, e.g. to better match the actual physical conditions. For example the magnetic field formulas can be adapted to an actual coil design, the calibration parameters can be chosen differently, parameter estimation, a least square fit, a nonlinear calibration model, etc. can be used to determine the calibration parameters, etc.

In a specific embodiment of the present invention, the detection coils 2a,2b,2c can also be paired with additional dedicated transmission coils for the excitation signal, which are aligned in the same plane and magnetically coaxial to the detection coil, wherein they can be electrically separated or share one of their ports.

The embodiment of FIG. 3a, FIG. 3b and FIG. 3c can in other word be described as a detection device 1, comprising at least a first 2a, a second 2b and a third 2c detection coil as well as a configuration unit, which is configured and built in such a way to configure one of the at least first 2a, second 2b or third 2c detection coil as a transmitter for a calibration signal by an application of an electrical excitation signal to the one coil, which calibration signal emanates a calibration field At,Bt,Ct which is sensed by at least two of the remaining of the detection coils to which the excitation signal is not applied, and calibration parameters for at least two of the coils are determined based on this sensed calibration field. In particular each of the first, second and third coil is subsequently energized by the excitation signal in turn and thereof resulting signals are measured by the remaining of the first, second and third coils, to self calibrate the device by determining calibration parameters for nullifying out deviations, in particular any offsets and gains.

FIG. 4a, FIG. 4a and FIG. 4a are showing some examples of specific embodiments of a detection device 1,1a,1b which can, according to a special aspect of the invention, be resized. As it can be seen from the basic formula, the depth determination for a service 10 is dependent on the distance 3,3a,3b in-between the coils 2a,2b,2c, wherein greater distances 3,3a,3b are favourable for an accurate determination of the depth "a"°13 of a service. Therefore, the devices 1 in prior art have to be rather longish to achieve a reasonable separation 3,3a,3b of the coils 2a,2b,2c. Although favourable for detection, this large size is not favourable in view of storage and/or transportation of the device 1. According to this special aspect of the invention, the device 1,1a,1b is built in an expandable way, e.g. in a telescopic, collapsible, foldable design. Therein, the coils 2a,2b,2c can be brought into a first detection location, which has a large coil spacing that allows reasonable depth detection. In the second storage or transportation location, the coils locations are brought into small spacing, which is narrower than the large spacing.

As the separation 3,3a,3b of the coils 2a,2b,2c has to be exactly known since it influences the determined depth "a"13—such an extensible design can suffer from reduced depth accuracy, since the coil locations with respect to each other might vary from extension to extension. Therefore, in prior art the coils 2a,2b,2c were rigidly fixed with respect to each other. The spacing in-between the coils 2a,2b,2c was usually not used for other purposes than for providing stability and was for example mostly filled with air. By the herein proposed self calibration, this drawback can be overcome, since influences of a slight varying coil location in the extended position can be determined in the calibration parameters and therefore compensated—allowing a higher guaranteed detection accuracy for a extendible device 1,1a, 1b than without.

FIG. 4a shows the first extended detection location of the coils 2a and 2b in the device 1, in which extended arrangement the detection or calibration is carried out. FIG. 4b shows an example of a second compressed storage location of the coils 2a and 2b in which the device 1b can be stored and/or transported. In this example of an embodiment, a folding- or hinge-mechanism is shown, indicated by the arrow 21b. In the example of an embodiment in FIG. 4c a telescopic mechanism is used for providing a variability to the coils 2a,2b locations in the device 1c, which is indicated by the arrow 21c. Still, there are also other known techniques to provide and implement the mechanical extendibility according to this aspect of the invention. The same principles can also be used if more than the two shown coils 2a,2b are used, e.g. for the three coils 2a,2b,2c of the example above or more. The first and/or the second location can therein be embodied to be blocked during their respective usage.

FIG. 5 shows an example of a basic block diagram of an embodiment of the present invention that shows a functional flow of the self-calibration according to the invention.

In block 50 the calibration routine according to the present invention is started. As it is a self-calibration of the device 1, this can be done independent from external equipment, for example in the field before the device 1 is used for depth detection.

In block 51, the calibration unit of the device 1 configures one of the detection coils 2a,2b,2c as transmitter. This comprises block 52, with an applying of an electrical signal source to the one coil, for example by generating an electrical excitation signal and switching this signal to the one coil. This one coil then emits a calibration field based on the excitation signal. As shown by block 53, the resulting calibration field can be detected by the remaining detection coils, which are not configured as a transmitter. Those remaining detection coils are configured in ordinary receiving mode, as they are, when an occluded structure is detected in a detection mode after the calibration. The values of the detected signals from the calibration fields are stored.

In block 54, a permutation of the one coil that was used as a transmitter is done towards another coil. In particular the coils are subsequently configured as transmitter, preferably all of the coils present in the device are configured as transmitter one after the other, while the remaining coils are detecting the resulting calibration fields. This is indicated by the loop 55, which is done for multiple, in particular all of the coils.

In block 56, the calibration parameters are determined based on the stored values of the received fields during above calibration loop. The calibration parameters, which can in a simple linear error model comprise an offset and a gain parameter but can also be chosen differently, are then determined from the stored values, considering the underlying physical principles and dependencies.

To avoid influences from environmental fields, in a certain embodiment, the excitation signal can be chosen to have special characteristics like a frequency, modulation or coding, according to which it can be identified and/or distinguished from environmental signals by the calibration unit. In a special embodiment—where only a correlated portion of the signals from the at least two detection coils is used to determine the depth, e.g. the proximity determination is done with a filtering which can only be passed by a portion of signals from coil 2a and 2b, which is correlated to each other, wherein an additional time/phase shift of those signals due to the coil spacing 3, etc. can be considered—such a correlation between the received signals and/or the excitation signal can also be considered for the calibration according to the present invention.

The following special aspect might also be considered as an invention on its own, when seen without the calibration presented above. In addition to the calibration, but also for the calibration, it is also important for the performance of the detection device 1 to achieve high sensitivity, high linearity and a good signal to noise ratio.

The traditional method of designing a coil 2a,2b,2c for cable detection is based on Faradays law of induction. For example, an often used Rogowski Coil has an output voltage which is proportional to the number of turns "n". In order to obtain more sensitivity or voltage output, it is therefore apparent to simply add more turns of wire onto the coil. Cable detection coil designs in prior art often have 10'000's turns or more and are therefore large and heavy. Those many turns are often separated into multiple channels, so that the wire windings are separated to reduce the self capacitance of the coil.

Figure 6:
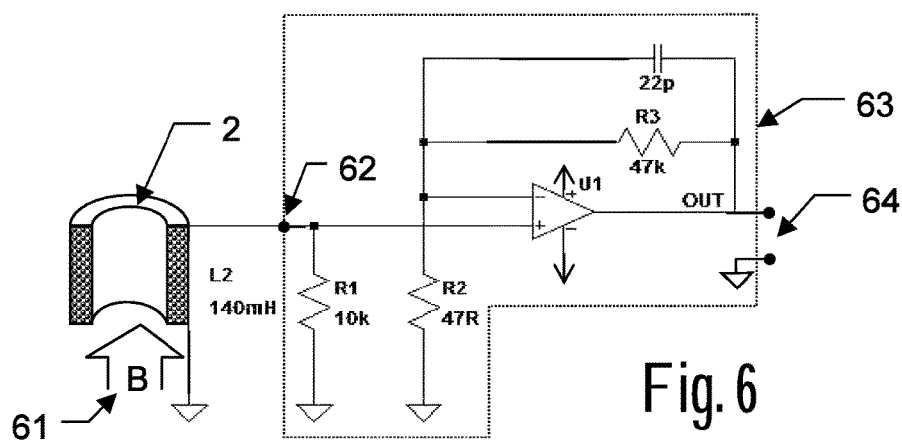
FIG. 6 shows an example of a known coil detection circuitry.

A typical known detection coil 2 with its corresponding electronics design 63 implementing a voltage detection principle is shown in FIG. 6. The detected magnetic B field 61 generates an output voltage Vout at the terminal 62 of the detection coil 2. For example, a common used detection coil L2 2 can have about 900 turns, an average winding diameter of about 70 mm, with a series resistance of about 470 Ohm, a self capacitance of about 5 nF and an inductance of about 140 mH. Analyzing a thereto corresponding electrical equivalent circuit results in an expression for the sensitivity of the coil on its own in Volts/Tesla of $$V/B = j \cdot 2 \cdot \pi^2 \cdot f \cdot n \cdot a^2. \quad (20)$$

With f=frequency, n=number of turns, a=radius of a Rogowski coil, B=magnetic flux, V=output voltage.

In formula (20), the sensitivity is proportional to f, n, and $a^2$ and not dependent on the inductance L.

In a practical embodiment, the proportionality to the winding count n and to the enclosed coil area $a^2$, fits quite well, but for the frequency response also the evaluation circuit 63 connected to the coil 2 at port 62 and its input impedance $R_{in}$ has to be considered. This results in an expression for the sensitivity at high frequency that becomes $$V/B = \pi \cdot n \cdot a^2 \cdot Rin/L. \quad (21)$$

This expression (21) for the sensitivity is now independent of frequency, but in a practical application there is a roll off at higher frequencies due to the self capacitance of the coil, which is not included in above formula for simplicity.

Figure 7:
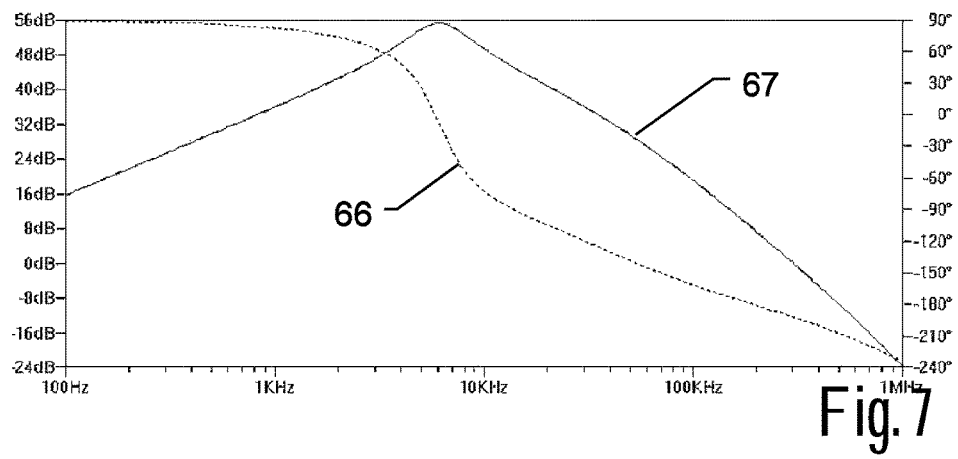
FIG. 7 shows an example of a baud plot of a circuitry of FIG. 6.

FIG. 7 shows an example of a typical baud-plot, with sensitivity 67 and phase 66 over frequency, of a commonly used circuit like the one of FIG. 6. It reveals a nonlinear sensitivity with a resonance at about 5 kHz, but neither mains-frequencies, artificially induced detection frequencies nor typically naturally emitted Radio frequencies, which are to be detected by a detection device benefit from this resonance.

Figure 8:
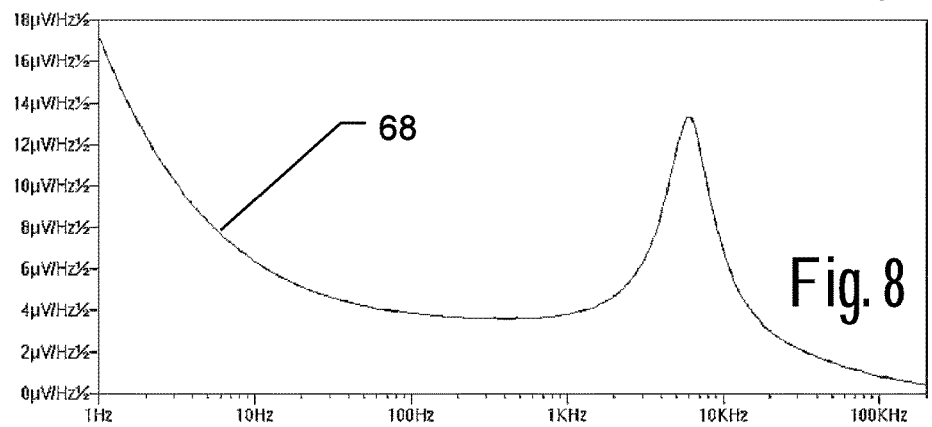
FIG. 8 shows an example of a noise plot of a circuitry of FIG. 6.

FIG. 8 shows a typical example of a corresponding noise plot over frequency of a commonly used circuit like the one of FIG. 6. The noise curve 68 has its highest noise levels in the low frequency ranges, which have to be sensed for mains detection, and a noise peak in the range of the resonance frequency from above.

Prior to or without the following aspect of the present invention, the practical problems encountered with designing a detection coil 2 was to achieve many turns with low self capacitance, which limits the high frequency operation. As a solution, various methods have been devised like wave winding and segregation of the windings into multiple segments, all of those consequently making the volume of the coil 2 even larger.

It can be seen that above-mentioned known and used approach for designing detection coil 2 evaluation circuitries 63, has its drawbacks, in particular in view of nonlinearity, sensitivity and noise, but also in the large coils with many windings which are required. In view of the calibration according to the invention, in particular the nonlinearity over frequency, but also the noise and sensitivity can hinder an accurate calibration. For example, in view of the nonlinearity it can likely be required to calibrate each of the detection frequency bands separately.

According to this aspect of the invention, an alternative design for the above described detection circuit for a cable detection device is proposed. Compared to prior art, the approach of this aspect of the invention is more linear in its output, not dependent on the number of turns and also has higher sensitivity at low frequencies, as explained in detail below. In particular, the calibration according to the present invention will benefit there from, but it brings also advantages on its own. Without the calibration aspect, it might be considered as a standalone invention in the field of the art of cable detection.

Figure 9:
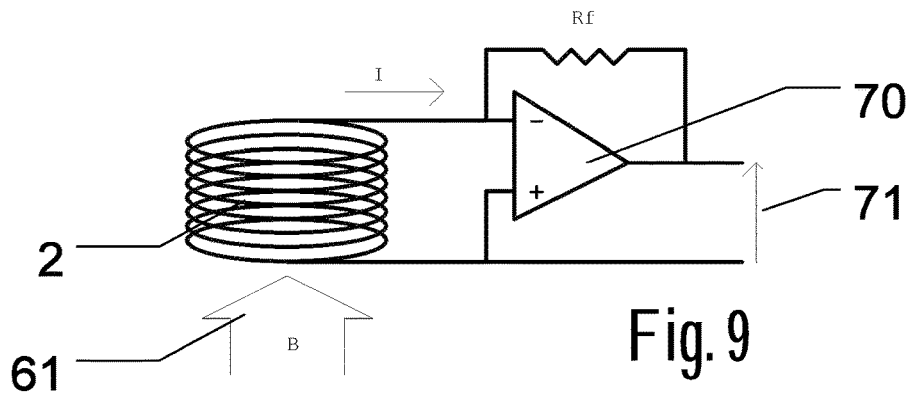
FIG. 9 shows an example of a first embodiment of a circuit according to a certain aspect of the invention.

FIG. 9 shows the basics of a current detection model according to this aspect of the invention. As in FIG. 6 before, B represents the magnetic field 61 penetrating the coil 2, Vout 71 is the output voltage of the reception circuitry and I is the current flowing through the coil 2. The coil 2, which comprises one or more loops of an electrical wire conductor, can as before be modelled by its inductance L, its series resistance R and its capacity C. The amplifier according to this aspect of the invention is a current amplification stage, with an operational amplifier 70 and its current input mode feedback network $R_f$, $R_f$ symbolized a feedback network used with the amplifier according to the aspect of the invention.

Thereof, a sensitivity expression can be derived as:

$$\frac{V}{B} = -\frac{n \cdot \pi \cdot a^2 \cdot Rf}{L}, \quad (22)$$

with $R_f$=feedback impedance, V=output voltage, L=coil-inductance, B=magnetic field, n=number of turns, a=radius of the coil.

It can already be noted that above formula (22) suggest that the sensitivity is now independent of frequency. Considering the inductance L, a coil of e.g. of rectangular cross section can be defined by the equation:

$$L = P_0 \cdot a \cdot n^2, \quad (23)$$

where "a" is the mean coil-radius, "n" the number of turns and $P_0$ the coil-coefficient which can be found in textbooks. There are also other formulas for a numerical determination of a coils inductance known, but in rough approach they are also approximately proportional to a and the square of n.

Substituting above formula (23) in formula (22) and considering the series resistance of the coil 2 with its additional parameters ρ=resistivity of the coil winding material and s=cross sectional area of the conductor of the winding, and by considering Ohms law gives an expression for the sensitivity of:

$$\frac{Vout}{B} = \frac{j \cdot \pi \cdot f \cdot a \cdot s \cdot Rf}{\rho}.$$

The above shown expression for the sensitivity is not depend on the number n of turns and is inversely proportional to the resistance of the wire. According to this aspect of the present invention therefore, a low number of turns of a thick conductor is favoured over the high winding count used in prior art approaches.

According to the theoretical formula above, a single turn of thick, highly conductive wire would be the preferred option, as thereby a high sensitivity at the output can be obtained, which is not frequency dependant. Nevertheless, when considering non ideal components, in particular amplifiers 70 the principle of low winding count and a large cross-section, highly conductive winding material remains, but has to be optimized in to the used components, so that a winding count greater than one, but still low, say below a few hundred turns might be practically implemented as optimal compromise which also depends on the selected type of OpAmp 70 and can e.g. be determined by simulation. For high sensitivity, there is also a low noise design of the components and its setup required, in order to measure the desired weak electromagnetic fields, in particular in the desired frequency range of about 50 Hz to 250 kHz that is used in cable detection. For the overall performance not only the sensitivity, but also the achievable SNR has to be considered. If just a single turn of large diameter wire is used, for maximum sensitivity, then the resistance is essentially a short circuit to the operational amplifier. Therefore, the offset and current noise specification of the amplifier has to be carefully considered or otherwise it might overlay the improved sensitivity by a higher noise floor, hindering the detection of the desired signal.

Figure 10:
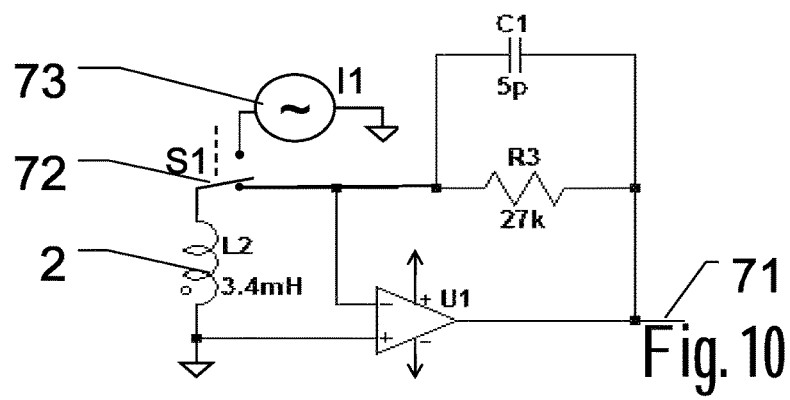
FIG. 10 shows an example of a second embodiment of a circuit according to the certain aspect of the invention.

FIG. 10 shows an example of an embodiment, with the detection coil 2, which can—as discussed at top—be configured as a transmitter by the calibration unit, when the switch 72 contacts the excitation signal source 73, or be configured in ordinary receiving mode, when the switch 72 contacts the amplification stage according to the aspect of invention discussed right before. The values of the used parts are only illustrative and not limiting. In another here not shown embodiment, the amplification stage can be directly connected to the coil, whereby an applied excitation signal from 73 can also be detected by the same circuit which otherwise detects the received signals.

Figure 11:
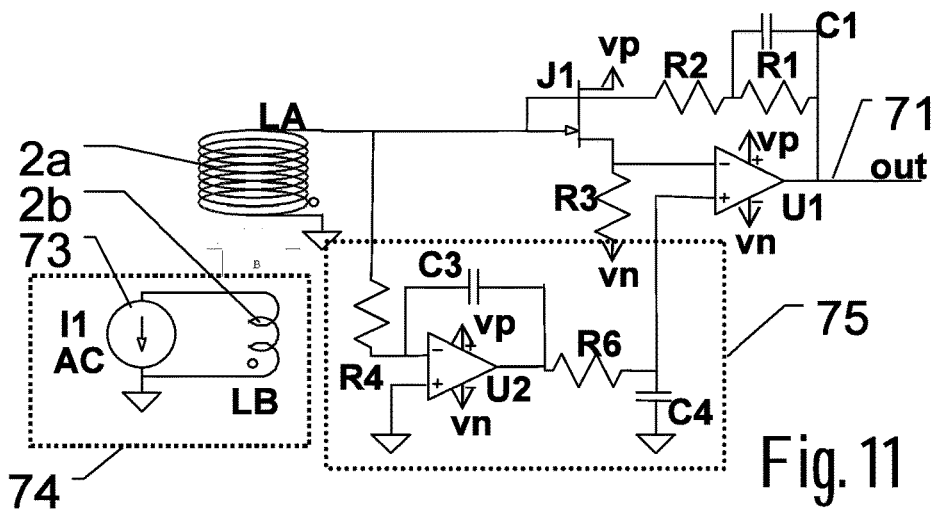
FIG. 11 shows an example of a third embodiment of a circuit according to the certain aspect of the invention.

FIG. 11 shows another example of another embodiment with characteristics according to the aspect of the present invention, wherein the input stage connected to the coil comprises a JFET J1 in the first stage, fed back with an OpAmp U1. The bootstrapping circuit 75 is shown as an exemplary embodiment and can also be realized differently. In addition to the detection circuit for the coil 2a of the certain aspect of the invention, there is also a coil 2b of the detection device shown, which is configured for transmission by the calibration unit. The signal source 73 applies an excitation signal to the coil 2b, which emits a calibration field B which couples to the detection coil 2b that is located with a spacing from coil 2a, to achieve the calibration as discussed before.

Figure 12:
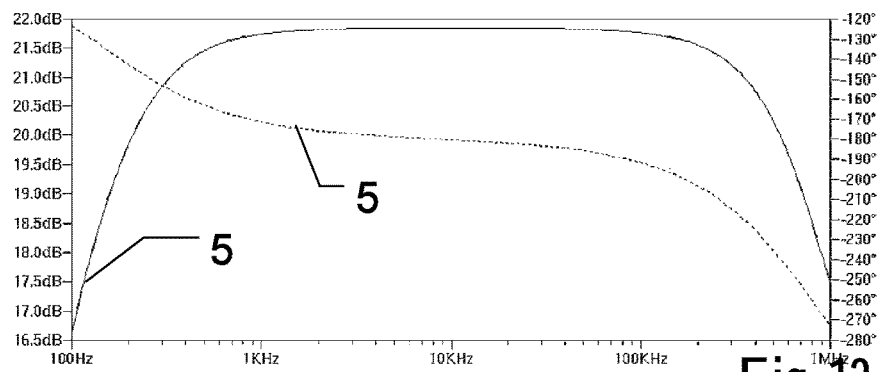
FIG. 12 shows an example of a bode plot of a circuit according to the certain aspect of the invention, like the one of FIG. 10.
Figure 13:
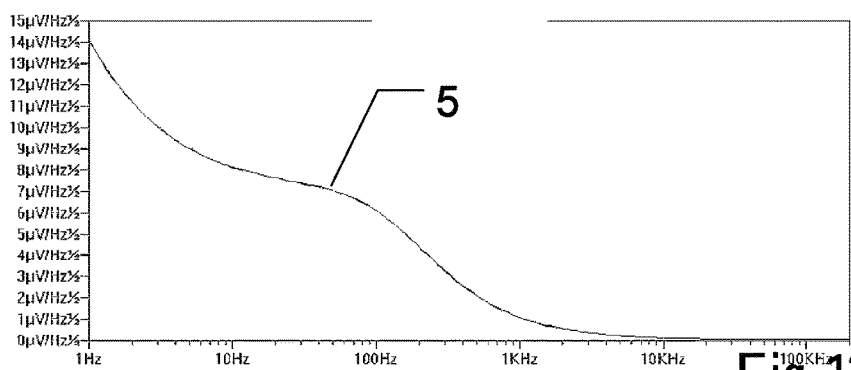
FIG. 13 shows an example of a noise plot of a circuit according to the certain aspect of the invention, like the one of FIG. 10.

FIG. 12 shows a baud-blot with phase 76 and amplitude 77 of detection according to the present aspect of the invention, which is obviously much more linear than the one of FIG. 7, in particular when considering the change in scales. Also, the noise curve 78 shown in FIG. 13 has improved compared to the one of FIG. 8.

Figure 14:
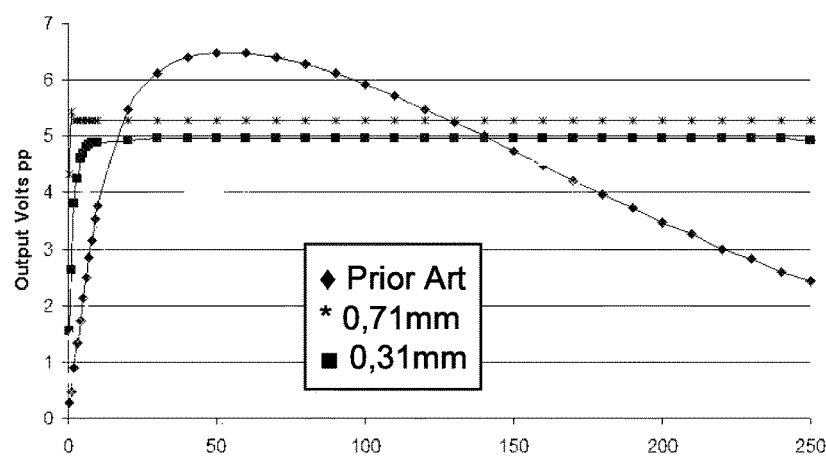
FIG. 14 shows a comparison of sensitivity plots of the known coil detection circuitry and the ones according to the certain aspect of the invention.

Some examples from experimental results, which were evaluated with a different number of turns and different wire diameters are exemplary shown in FIG. 14. The diagrams are showing the output voltages Vout as indicated in FIG. 9, FIG. 10 or FIG. 11 over a frequency range in kHz, which is resulting when the coil 2 is provided with an electromagnetic field of defined strength at this frequency.

As an example of typical dimensional ranges according to the certain aspect of the invention, a coil-embodiment with about 20 turns of wire, wound to a coil of about 90 mm diameter can be considered. The embodiments are made from wire diameters of 0.71 mm, 0.315 mm, although other diameters might be used as well. Apparently, it is not required to use a round cross section material for the winding, e.g. also square rods or foil strips can be used to form one or more windings according to the invention. The winding should consist of a good conductor, preferably copper, but also e.g. aluminium, gold or silver. The diagram shows that a larger diameter wire (generally a higher cross-section area) achieves more sensitivity at lower frequencies than smaller ones. In comparison, the prior art approach with a high turn, voltage amplified coil is shown in comparison. In particular in view of the desired frequency ranges being most relevant for the given buried service detection application, the improved sensitivity in those desired bands in the low frequency range of 50 to 200 Hz can be seen.

Figure 15:
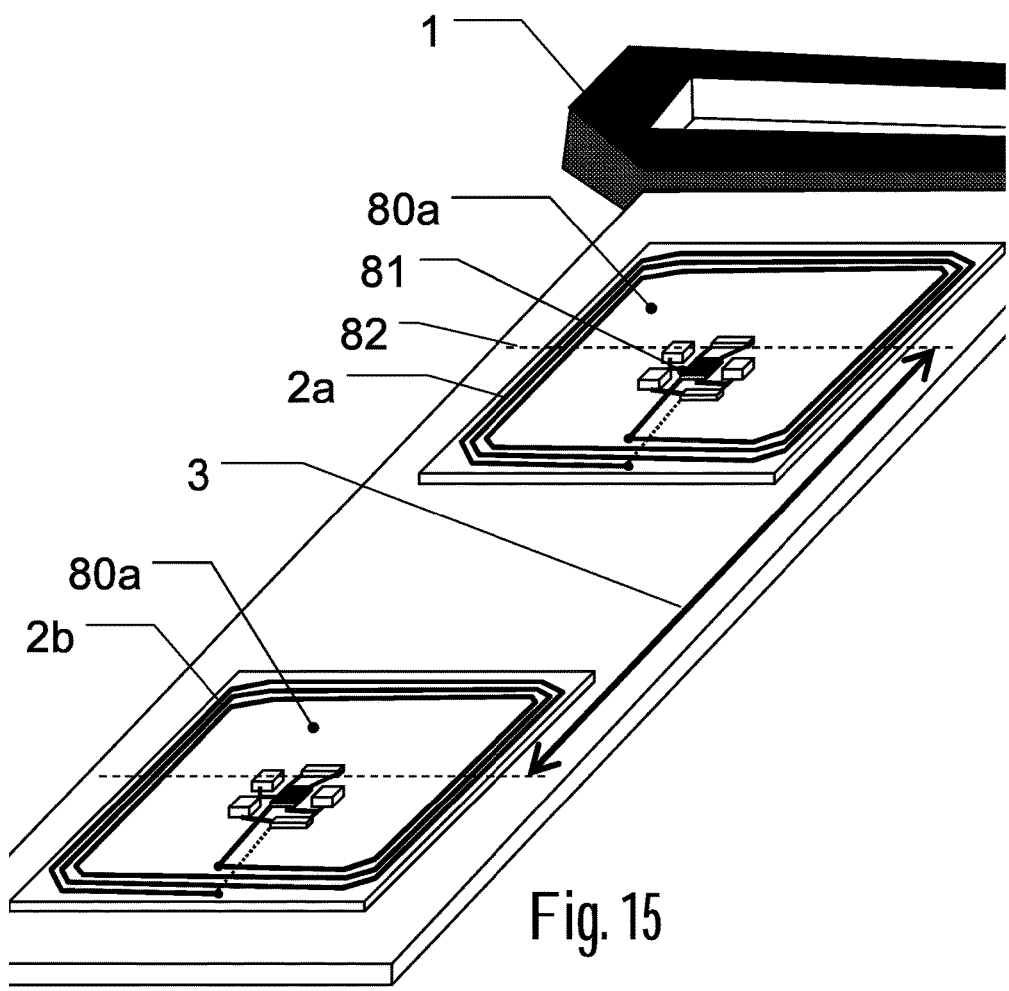
FIG. 15 shows a possible embodiment of a detection device according to the invention comprising the certain aspect.

In an example, which is discussed based on the exemplary working-embodiment shown in FIG. 15, the desired frequency band to be covered will be from about 50 Hz to about 250 kHz. Also, other factors like low power consumption, lightweight, decent temperature ranges for field applications, and small dimensions are factors that are to be considered. The coil 2a,2b is designed with exemplary dimensions, which are reasonable for a handheld cable location tool and preferably smaller than prior art devices while having the same sensitivity. For example, the coils can be set to about a square of 80 mm×80 mm—which equals to a mean radius of about 90 mm. A coil area in that order has proven to provide sufficient sensitivity required to achieve a 5m detection distance from a buried service 10 for the present detection devices 1, which roughly equals to 4E−9 Tesla, wherefore a targeted sensitivity for magnetic fields can be around E−12 Tesla.

As a special aspect of this embodiment of the present invention, the coils 2a,2b are embodied by tracks on a PCB 80a,80b, which printed circuit board can also comprise at least part of the electronics of the detection device 1, in particular a current amplification stage 81 according to the special aspect of the invention, which actually allows to achieve reasonable detection performance with the low winding counts that can be embodied in a PCB, which will in general be about or less than 100 turns. If desired, the copper layer on the PCB can be chosen rather thick, to also achieve a large cross section area of the winding.

There are two PCBs 80a and 80b, each with a detection coil 2A resp. 2b shown, with their coil axis 82 spaced by the distance 3, but also other coil configurations, like e.g. a three coil arrangement as in FIG. 3a can be realized and/or the expandability of FIG. 4b or FIG. 4c can be combined. By the shown design, a lightweight detection device 1 of small size can be built. The PCB coils allow an even smaller, lighter and efficient design and gain noise immunity when the first amplification stage 81 is located close to the coil. Nevertheless, also wire wound coils could be used in another embodiment, in particular with a low count of turns of a thick wire—as described above.

The shown device 1 also comprises a calibration unit which is built in such a way that for calibration each one of the coils 2a,2b within the device 1 is subsequently configured as transmitters by an application of an excitation signal. The thereby transmitted calibration field is picked up by the remaining coils and a self-calibration of the device is determined as calibration parameters for the coils 2a,2b, based on the picked up signals. The calibration also gains additional advantages of the high linearity of the current amplifier aspect of the detection, whereby the accuracy and sensitivity of the device 1 can be further improved. By the calibration parameters, not only the coils 2a,2b and their spacing 3, but also the evaluation circuit, e.g. comprising the current amplifier, possible additional amplifiers and/or filters, and an Analog to Digital converter will be comprised in the calibration.

A skilled person is aware of the fact that details, which are here shown and explained with respect to different embodiments, can also be combined with details from other embodiments and in other permutations in the sense of the invention.

What is claimed is:

1. A mobile detection device for an evaluation of a distance/depth value from the mobile detection device to an occluded AC carrying structure, which evaluation is done according to a magnetic field emanated from the structure by the AC-current, with the mobile detection device comprising:
- a plurality of detection coils, each comprising at least one winding of an electrically conductive material, which are arranged at a fixed location with a spacing with respect to one another;
- an electronic signal evaluation unit for detecting the structure according to an electrical signal induced in the plurality of detection coils by the magnetic field and evaluating the distance value according to a difference of the electrical signal in-between at least two of the plurality of detection coils; and
- a calibration unit built to configure one of the plurality of detection coils as a transmitter for a calibration field by applying an electrical excitation signal to the transmitter, wherein the calibration field is detected by the remaining of the plurality detection of coils; and
- wherein calibration parameters for the plurality of detection coils are determined by the calibration unit based on the detected calibration field.

2. The mobile detection device according to claim 1, wherein:
the calibration parameters comprise at least one of a calibration scaling factor and a calibration offset.

3. The mobile detection device according to claim 1, wherein:
the mobile detection device comprises only a first and a second of the plurality of detection coils, and
the calibration unit is built to successively configure one of the detection coils as the transmitter for the calibration field, while detecting the calibration field with the remaining detection coil.

4. The mobile detection device according to claim 1, wherein:
the mobile detection device comprises at least a first, a second, and a third detection coil of the plurality of detection coils, and the calibration unit is built to successively apply the electrical excitation signal to one of the at least first, second, or third detection coil to transmit the calibration field, which calibration field is detected by the two remaining of the detection coils to which the excitation signal is not applied, wherein the calibration parameters for at least two of the coils are determined based on the detected calibration field and wherein the calibration parameters also comprise a spacing parameter of the detection coils for at least two of the detection coils.

5. The mobile detection device according to claim 1, wherein:
the electrical excitation signal is generated by a current signal generator, preferably by one single signal generator whose output is selectively switchable to one of the detection coils.

6. The mobile detection device according to claim 5, wherein:
the electrical excitation signal is having a variable or modulatable amplitude and/or frequency.

7. The mobile detection device according to claim 6, wherein:
the calibration signal is modulated or coded in such a way to make it uniquely distinguishable from other environmental signals and noise.

8. The mobile detection device according to claim 1, wherein:
the electronic signal evaluation unit comprises an amplifier circuit embodied as a current sensing amplifier as a first amplification stage which is connected to the detection coil.

9. The mobile detection device according to claim 1, wherein:
the electronic signal evaluation unit comprises an amplifier circuit embodied as a transimpedance amplifier as a first amplification stage which is connected to the detection coil.

10. The mobile detection device according to claim 1, wherein:
the detection coils each has a winding count of 1 to 500 turns of a conductor with a cross-section of at least 0.1 mm$^2$, wherein the winding of the detection coil encloses an area of more than 100 cm$^2$ and below 0.5 m$^2$, with an approximately rectangular or circular cross-section.

11. The mobile detection device according to claim 8, wherein:
the current sensing amplifier comprises an operational amplifier OpAmp with a feedback network in a current to voltage configuration, wherein:
the negative OpAmp input is connected to one end of the coil;
the other end of the coil is connected to the positive OpAmp input; and
the OpAmp output is fed back to the negative OpAmp input by a first impedance.

12. The mobile detection device according to claim 1, wherein:
the detection coils are embodied as tracks on a PCB.

13. The mobile detection device according to claim 1, wherein:
the detection coil has a dedicated transmitter winding portion for application of the excitation signal and a dedicated receiver winding portion for detecting magnetic fields.

14. The mobile detection device according to claim 13, wherein:
both winding portions are magnetically coaxial to each other.

15. The mobile detection device according to claim 13, wherein:
the two portions are on a common rigid carrier.

16. The mobile detection device according to claim 12, wherein the PCB comprises a current sensing amplifier operably coupled with the detection coils on the PCB.

17. The mobile detection device according to claim 12, wherein the calibration unit is built to calibrate the mobile detection device based on the calibration parameters.

18. The mobile detection device according to claim 12, wherein the calibration unit is built to calibrate the mobile detection device based on the calibration parameters.

19. A calibration method performed by a mobile detection device which comprises a plurality of detection coils for an evaluation of a distance value from the mobile detection device to an occluded AC carrying structure according to the structures emanated magnetic field, the method performed by the mobile detection device comprising:
applying an electrical excitation signal to one of the plurality of detection coils, which then acts as a magnetic field transmitter for a calibration field;
receiving and evaluating the calibration field by the remaining detection coil of the plurality of detection coils, which is done multiple times with a permutation of the plurality of detection coils usage for transmitting or receiving; and determining calibration parameters for at least two of the plurality of detection coils is done by a calibration unit, based on a set of the evaluated calibration fields from each permutation.

20. The method according to claim 19, wherein:
the calibration parameters comprise an offset and gain calibration parameter for each detection coil.

21. The method according to claim 19, wherein:
the mobile detection device comprises at least a first, a second, and a third detection coil of the plurality of detection coils, and the calibration unit is:
successively applying an electrical excitation signal to one of the at least first, second, or third detection coils for transmitting the calibration field,
detecting the calibration field by the remaining of the detection coils to which the excitation signal is not applied, and
storing values of the calibration field.

22. The method according to claim 19, wherein:
the determining of the calibration parameters comprise a spacing parameter of the detection coils.

23. The method according to claim 19, wherein:
the receiving and evaluating with the detection coils comprises an amplifying of the detection coils output in current mode by a current mode amplifier which is providing low input impedance to the detection coil, wherein the winding count is of the coil is below 100.

24. A non-transitory computer program product comprising program code stored on a machine-readable medium for a calibration of a detection device, built for executing the steps of the method of claim 19.

25. A mobile detection device for an evaluation of a distance/depth value from the mobile detection device to an occluded AC-current carrying structure according to the structure's emanated magnetic field, the mobile detection device comprising:
a plurality of printed circuit boards (PCB) having a plurality of detection coils, each detection coil comprising at least one winding of an electrically conductive material, which detection coils are arranged at a fixed location with a spacing with respect to one another, wherein each of the detection coils is embodied by tracks on the printed circuit board (PCB); and an electronic signal evaluation unit for detecting the structure according to an electrical signal induced in the plurality of detection coils by the magnetic field and evaluating the distance value according to a difference of the electrical signal in-between at least two of the plurality of detection coils; and wherein the plurality of printed circuit boards (PCB) comprises at least one calibration coil embodied as tracks on the printed circuit board (PCB), wherein the at least one calibration coil may be at least one detection coil of the plurality of detection coils or at least one dedicated calibration coil; and a calibration unit built to configure the at least one calibration coil as a transmitter for a calibration field by applying an electrical excitation signal to the at least one calibration coil, which calibration field is detected by the plurality of detection coils, and wherein calibration parameters for the plurality of detection coils are determined by the calibration unit based on the detected calibration field.

26. The mobile detection device according to claim 25, wherein:
at least one detection coil of the plurality of the detection coils and at least one calibration coil are embodied as tracks on a common printed circuit board (PCB).

27. The mobile detection device according to claim 25, wherein:
at least one of the plurality of the detection coils and the at least one calibration coil are magnetically coaxial to each other.

28. The mobile detection device according to claim 25, wherein:
at least one of the plurality of detection coils is used as the at least one calibration coil.

29. The mobile detection device according to claim 25, wherein:
the at least one calibration coil is the at least one dedicated calibration coil.

30. The mobile detection device according to claim 25, wherein:
at least one detection coil of the plurality of the detection coils and at least one calibration coil are embodied as separate tracks on a common printed circuit board (PCB).

* * * * *